Patented May 25, 1926.

1,586,357

UNITED STATES PATENT OFFICE.

LAZAR EDELEANU, OF BERLIN-CHARLOTTENBURG, GERMANY.

MANUFACTURE OF LIGHT HYDROCARBONS.

No Drawing. Application filed January 20, 1925, Serial No. 3,684, and in Germany December 17, 1924.

The present process refers to the manufacture of light hydrocarbons, having low boiling points, from heavy hydrocarbons of mineral oils and to the manufacture of an agent for accelerating and facilitating this process.

The mineral oils contain two classes of hydrocarbons which are distinguished from each other by their solubility in several solvents, of which I cite especially in liquefied sulphurdioxide. I have found that aluminiumchloride gives with the hydrocarbons, preferably purified by liquefied sulphurdioxide, at low temperatures a double compound of aluminium chloride with hydrocarbons, which compound constitutes a viscous oil, generally of brownish-yellow colour. The said oily compound can readily be separated from the part of the hydrocarbons which has not reacted by decantation.

This oily compound, designated in the present specification as the "double compound" or "brown-oil" maintains its liquid state even at low temperatures. If one adds gradually or successively the oily double compound to the heavy hydrocarbons to be converted, preferably heated to the reaction temperature, an equal reaction with the conversion into low boiling hydrocarbons, (for instance formation of gasoline from gas oils) occurs without formation of appreciable amounts of difficultly condensable gases and evolution of hydrochloric acid. If one takes as raw materials only the hydrocarbons of the class that are insoluble in liquefied sulphurdioxide, it is possible to convert substantially the whole treated volume into lighter hydrocarbons.

The double compound of aluminiumchloride with the hydrocarbons, purified by liquefied sulphurdioxide, is distinguished from similar compounds with the substances soluble in liquefied sulphurdioxide. My double compound is liquid at ordinary or low temperature, does not adhere to the walls of the glass vessels, flows off readily from surfaces of vessels and flows through narrow pipes. By the action of water it is decomposed to aluminiumcompounds and hydrocarbons. In contradistinction to this, the compound of aluminiumchloride with the mineral oil hydrocarbons and other substances soluble in liquefied sulphurdioxide, is at the normal, i. e., at ordinary temperature or below, resinous, sticky and adhesive, adheres to the walls of glass vessels, does not flow through narrow pipes and gives with water besides aluminiumcompounds resinous and asphaltic products, which interfere with the operation and the efficiency of the double aluminium chloride compound as a reagent.

The conversion of the heavy mineral oil hydrocarbons into lighter hydrocarbons having lower boiling points, by means of my double compounds, gives a regular reaction and has the advantage of requiring only a little addition of the agent to the hydrocarbons to be converted and of causing the conversion quickly at a relatively low temperature. Especially, it is possible to add to the bulk of the hydrocarbons to be converted by gradually adding new amounts of the double compound and new portions of the mineral oils so long as the formed lighter hydrocarbons continue to distill off.

The process advantageously utilizes two steps, illustrated by the following example.

*Step 1.*—To 100 parts by weight of a Californian gasoil, specific gravity 0.875, which has been previously purified by treatment with the liquefied sulphurdioxide in accordance with the process heretofore patented by me (U. S. Patent No. 911,553, dated Feb. 2, 1909), or by other suitable solvents or a refining process, there are added twenty to fifty parts by weight of aluminiumchloride, free of water, and preferably with agitation. The proportions mentioned are not restrictive for all cases. The mixture may be prepared at gentle heat, for instance at 30 to 90 degrees centigrade, although higher temperature may be applied, if it is below that at which a conversion of the heavy hydrocarbons begins. The added aluminiumchloride disappears and the formation of a double compound of the appearance of a brownish-yellow oil results. After this and, if desired, after short standing or gentle heating, this brownish-yellow oil may be separated out of the hydrocarbons which have not reacted, for instance by decantation. The double compound or "brown-oil" may be used, immediately after its preparation or after storage, for the conversion of the heavy hydrocarbons.

The gasoil, used for the preparation of the double compound, should be dry, i. e. free from moisture, even in traces, and free from substances which decompose aluminium-chloride, for instance of sulphurdioxide. The proportions cited above may be varied in wide measure. Instead of the gasoil one may use also other mineral oils or their fractions freed of the parts soluble in liquefied sulphurdioxide. The removal of the parts soluble in liquefied sulphurdioxide may be effected either by treatment with liquefied sulphurdioxide, or by extraction with other solvents, as for instance alcohols (ethyl- methyl- amyl- etc.) or by suitable refining processes, as by means of sulphuric acid and subsequent treatment with alkalies.

*Step 2.*—In a suitable low pressure still or heated vessel having conduits connected with suitable arrangements for condensing vapours, 100 parts by weight of a Californian gasoil, free of moisture, which has been previously deprived of the parts soluble in liquefied sulphurdioxide, is heated to the temperature at which a conversion with the double compound occurs, say to about 200 degrees centrigrade. Then gradually the double compound, prepared as by step 1, is added and the oil is maintained at the conversion temperature. The conversion begins at once and in the measure as the double compound is added, the lighter hydrocarbons i. e. the gasoline hydrocarbons distill off and are condensed. A good cooling is advantageous for recovering the low boiling parts. When the distillation of the gasoline hydrocarbons ceases, a new portion of double compound is added. Not more than 15% by weight of the double compound referred to will be necessary to convert all the hydrocarbons, but generally less will suffice. The whole volume of the used gasoil may be distilled off, and the distillate represents a good gasoline, composed substantially only of saturated hydrocarbons. Other than the formation of very small amounts of difficulty condensable gases, no further appreciable losses are experienced. The following comparison of the results attained by my process and ordinary fractional distillation operating upon the same oil and under the same conditions is illustrative of the advantages of my process over commercial processes heretofore in use. First, by my process from 100 parts by volume of gasoil 80 parts or more by volume of light hydrocarbons are recovered, which is approximately one-third more yield than is attained by other processes. Sixty-five percent of the product will boil below 220° C.; whereas with other commercial processes in use from 100 parts by volume the yield will be little more than sixty-five percent (65%), and about forty-five percent (45%) only will boil below 220° C. The crude reaction product of my process will have an index figure of about 67° B., whereas the crude reaction product produced today by the aluminum chloride treatment has an index figure of about 61° B.

The second step is not restricted to the mineral oils described therein, but other mineral oils may be used whether refined or not.

I claim:—

1. The process for converting mineral oils into light hydrocarbons of lower boiling point which consists in preparing a double compound of mineral oils previously deprived of the constituents soluble in liquefied sulphurdioxide, with aluminiumchloride, adding gradually the said double compound to the mineral oil to be converted and causing the said double compound to react on the mineral oil by heating.

2. The process for converting mineral oils into light hydrocarbons of lower boiling point which consists in depriving said oil of the constituents soluble in liquefied sulphur dioxide, preparing a double compound of said mineral oils by treating with aluminum chloride, adding gradually the said double compound to the mineral oil to be converted, and causing the said double compound to react on the mineral oil by heating.

3. The process for converting mineral oils into light hydrocarbons of lower boiling point which consists in mixing said oils in liquefied sulphur dioxide, separating the undissolved constituents of the said mineral oils from the constituents dissolved in liquefied sulphur dioxide, preparing a double compound of the undissolved constituents with aluminum chloride, adding gradually the said double compound to the mineral oil to be converted which mineral oil has been previously mixed with liquefied sulphur dioxide and the solution of constituents in liquefied sulphur dioxide has been separated out, and causing the said double compound to react on the mineral oil by heating.

4. The process for converting mineral oils into light hydrocarbons of lower boiling point which consists in preparing a double compound of mineral oils, previously deprived of the constituents soluble in liquefied sulphur dioxide, with aluminum chloride, adding gradually the said double compound to the mineral oil to be converted which mineral oil has been previously deprived of the constituents soluble in liquefied sulphur dioxide, and causing the said double compound to react on the mineral oil by heating.

In testimony whereof I hereunto affix my signature.

LAZAR EDELEANU.